(12) United States Patent
Sekiya

(10) Patent No.: US 10,938,339 B2
(45) Date of Patent: Mar. 2, 2021

(54) INSTALLATION METHOD OF SOLAR PANEL AND SOLAR PANEL

(71) Applicant: DISCO CORPORATION, Tokyo (JP)

(72) Inventor: Kazuma Sekiya, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 0 days.

(21) Appl. No.: 16/133,232

(22) Filed: Sep. 17, 2018

(65) Prior Publication Data

US 2019/0089297 A1    Mar. 21, 2019

(30) Foreign Application Priority Data

Sep. 21, 2017  (JP) .............................. JP2017-181543

(51) Int. Cl.
| | | |
|---|---|---|
| *H02S 40/12* | (2014.01) | |
| *B06B 1/02* | (2006.01) | |
| *H02S 30/10* | (2014.01) | |
| *F24S 40/20* | (2018.01) | |
| *H02S 20/23* | (2014.01) | |
| *H02S 40/10* | (2014.01) | |
| *B06B 1/06* | (2006.01) | |
| *H02S 20/10* | (2014.01) | |

(52) U.S. Cl.
CPC .............. *H02S 40/12* (2014.12); *B06B 1/02* (2013.01); *B06B 1/06* (2013.01); *F24S 40/20* (2018.05); *H02S 20/10* (2014.12); *H02S 20/23* (2014.12); *H02S 30/10* (2014.12); *H02S 40/10* (2014.12)

(58) Field of Classification Search
CPC .... H02S 40/10; H02S 40/12; H02S 20/10–24; H02S 20/30; H02S 30/10; B08B 7/02; B08B 7/028; B06B 1/02; B06B 1/06
See application file for complete search history.

(56) References Cited

U.S. PATENT DOCUMENTS

| | | | |
|---|---|---|---|
| 2015/0047688 A1* | 2/2015 | Gharib ...................... B08B 7/02 | 136/244 |
| 2015/0144580 A1* | 5/2015 | Kitano .................... H02S 20/00 | 211/41.17 |

FOREIGN PATENT DOCUMENTS

JP        2005240387 A    9/2005

* cited by examiner

*Primary Examiner* — Lindsey A Bernier
(74) *Attorney, Agent, or Firm* — Greer Burns & Crain, Ltd.

(57) ABSTRACT

An installation method of a solar panel includes: an installation step of installing the solar panel such that a light receiving surface of the solar panel is inclined with respect to the horizontal direction and faces the sun; and an ultrasonic vibrator arrangement step of arranging an ultrasonic vibrator generating ultrasonic vibration to the light receiving surface of the solar panel, before or after the installation step is performed, and snow or dust deposited on the light receiving surface of the solar panel is removed by the ultrasonic vibration.

7 Claims, 2 Drawing Sheets

INSTALLATION METHOD OF SOLAR PANEL AND SOLAR PANEL

BACKGROUND OF THE INVENTION

Field of the Invention

The present invention relates to an installation method of a solar panel and a solar panel.

Description of the Related Art

There have been increased houses provided with a solar panel on a roof to supply electric power by oneself (for example, see Japanese Patent Laid-open No. 2005-240387).

SUMMARY OF THE INVENTION

However, when snow or dust is deposited on a light receiving surface of a solar panel, an amount of receiving light decreases, causing a problem that sufficient electric power cannot be obtained. Periodically getting up on the roof and then removing snow or dust from the light receiving surface of the solar panel can prevent decrease of the amount of receiving light; however, such a removing work involves some danger and is also troublesome.

It is therefore an object of the present invention to provide an installation method of a solar panel capable of easily removing snow or dust deposited on a light receiving surface without involving some danger and a solar panel.

In accordance with an aspect of the present invention, there is provided an installation method of a solar panel, including: an installation step of installing the solar panel such that a light receiving surface of the solar panel is inclined with respect to the horizontal direction and faces the sun; and an ultrasonic vibrator arrangement step of arranging an ultrasonic vibrator generating ultrasonic vibration to the light receiving surface of the solar panel, before or after the installation step is performed, and snow or dust deposited on the light receiving surface of the solar panel is removed by the ultrasonic vibration.

In accordance with another aspect of the present invention, there is provided a solar panel including an ultrasonic vibrator generating ultrasonic vibration to a light receiving surface of the solar panel.

In the installation method of a solar panel according to the aspect of the present invention and the solar panel according to another aspect of the present invention, by generating, periodically or arbitrarily, ultrasonic vibration to the light receiving surface, it is possible to easily remove snow or dust deposited on the light receiving surface without involving some danger, so that an amount of receiving light can be maintained.

The above and other objects, features and advantages of the present invention and the manner of realizing them will become more apparent, and the invention itself will best be understood from a study of the following description and appended claims with reference to the attached drawings showing preferred embodiments of the invention.

DETAILED DESCRIPTION OF THE PREFERRED EMBODIMENTS

Figure 1:
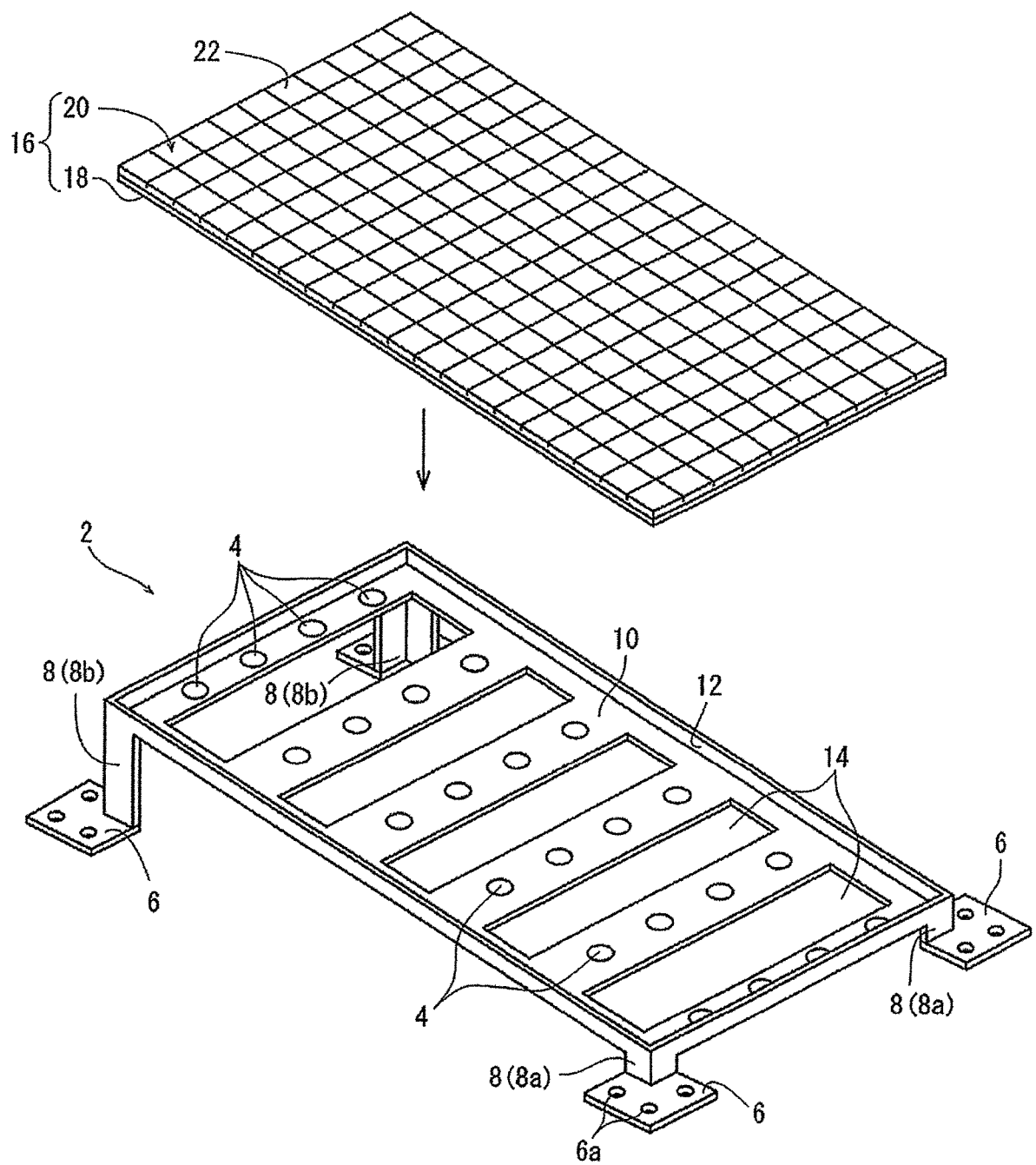
FIG. 1 is a perspective view illustrating a state in which a solar panel is installed.

An installation method of a solar panel according to a first embodiment of the present invention will be described with reference to FIG. 1.

In the first embodiment illustrated in the drawing, first, an ultrasonic vibrator arrangement step of arranging an ultrasonic vibrator generating ultrasonic vibration to a light receiving surface of a solar panel is performed. In the ultrasonic vibrator arrangement step according to the embodiment illustrated in the drawing, a plurality of ultrasonic vibrators 4 are arranged on an upper surface of an installation frame 2 for installing the solar panel. Regarding the installation frame 2, a description will be given herein in which the installation frame 2 includes four substrates 6 disposed at intervals, four support columns 8 each extending upward from an upper surface of each of the substrates 6, and a rectangular installation plate 10 fixed to an upper end portion of each of the support columns 8. In each of the substrates 6, a plurality of bolt holes 6a through each of which an anchor bolt (not illustrated) fixing the substrate 6 to an installation surface such as the ground passes are formed. As understood with reference to FIG. 1, among four support columns 8, two support columns 8 (8a) on the front side in FIG. 1 are formed shorter than two support columns 8 (8b) on the far side in FIG. 1, and the installation plate 10 is inclined with respect to the installation surface. A side wall 12 extending upward is formed at a peripheral edge of the installation plate 10. In addition, a plurality of rectangular-shaped openings 14 extending in a lateral direction (short direction) of the installation plate 10 are formed in the installation plate 10. Also, in the ultrasonic vibrator arrangement step according to the embodiment illustrated in the drawing, as illustrated in FIG. 1, the plurality of ultrasonic vibrators 4 in a circular shape which may be formed of piezoelectric ceramics or the like are arranged at intervals on an upper surface of the installation plate 10. Control means (not illustrated) controlling operation of the ultrasonic vibrators 4 and a power supply (not illustrated) supplying electric power to the ultrasonic vibrators 4 and the control means are connected to each of the ultrasonic vibrators 4. The control means constituted by a computer has a central processing unit (CPU) which performs arithmetic processing in accordance with a control program, a read only memory (ROM) storing the control program or the like therein, and a readable/writable random access memory (RAM) storing an arithmetic result or the like.

After the ultrasonic vibrator arrangement step is performed, an installation step of installing the solar panel such that the light receiving surface of the solar panel is inclined with respect to the horizontal direction (horizontal plane) and faces the sun is performed. In the installation step according to the embodiment illustrated in the drawing, first, a direction of the installation frame 2 is adjusted such that the upper surface of the installation plate 10 faces the sun, and then, the installation frame 2 is fixed to the installation surface by the anchor bolt. Subsequently, a solar panel 16 is placed on the upper surface of the installation plate 10 to be fixed. The solar panel 16 illustrated in FIG. 1 includes a rectangular panel 18 having a size corresponding to a size of the installation plate 10, and a solar cell 20 attached to an upper surface of the panel 18. By fixing the solar panel 16 on the upper surface of the installation plate 10 with the solar cell 20 facing upward, the solar panel 16 can be installed such that a light receiving surface 22 of the solar panel 16 is inclined with respect to the horizontal direction and faces the sun.

After the installation step is performed, periodically or arbitrarily, ultrasonic vibration is generated to the light receiving surface 22 of the solar panel 16 by the ultrasonic vibrators 4. For example, a control program for periodically operating the ultrasonic vibrators 4 is stored in the read only memory of the control means in advance, and ultrasonic vibration can be periodically generated to the light receiving surface 22. Alternatively, by operating the ultrasonic vibrators 4 upon inputting a command for operating the ultrasonic vibrators 4 to the control means, ultrasonic vibration may be arbitrarily generated to the light receiving surface 22. Thus, generation of ultrasonic vibration to the light receiving surface 22 enables easy removal of snow or dust deposited on the light receiving surface 22 without involving some danger, and accordingly, an amount of receiving light onto the solar panel 16 can be maintained. In the embodiment illustrated in the drawing, since the light receiving surface 22 of the solar panel 16 is inclined with respect to the horizontal direction, it is possible to efficiently flow snow deposited on the light receiving surface 22 down by generating ultrasonic vibration to the light receiving surface 22. In addition, even when dust is attached to the light receiving surface 22, ultrasonic vibration is generated to the light receiving surface 22 by inputting the command for operating the ultrasonic vibrators 4 to the control means when it rains, so that it is possible to remove the dust from the light receiving surface 22 by the ultrasonic vibration and rain water.

Note that, in the embodiment illustrated in the drawing, although an example has been described in which the installation step is performed after the ultrasonic vibrator arrangement step is performed, and vice versa. For example, by using an installation frame provided with an installation plate in which a through-hole opening for arranging each of the ultrasonic vibrators 4 is formed, the installation step is performed in which the solar panel 16 is installed on an upper surface of the installation plate, and then, it is possible to perform the ultrasonic vibrator arrangement step by attaching each of the ultrasonic vibrators 4 to the through-hole opening in the installation plate. Also, in the embodiment illustrated in the drawing, although an example has been described in which the installation plate 10 of the installation frame 2 is inclined with respect to the installation surface, when the installation frame 2 is fixed to an installation surface (for example, a roof of a building) which is inclined with respect to the horizontal plane (horizontal direction), the installation plate 10 of the installation frame 2 may not be inclined with respect to the installation surface, and more specifically, all of four support columns 8 may have the same length.

Next, a solar panel according to a second embodiment will be described with reference to FIG. 2A and FIG. 2B.

Figure 2A:
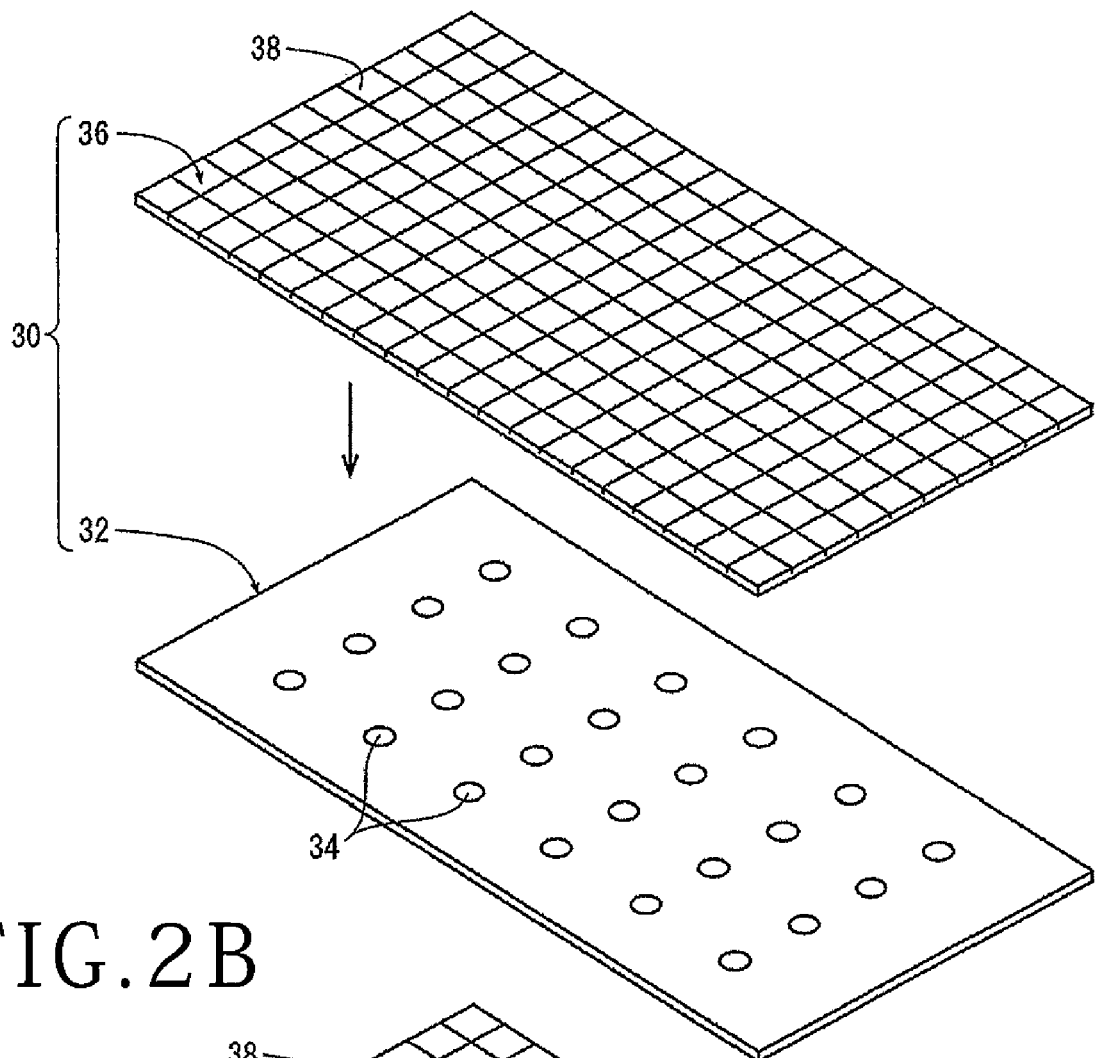
FIG. 2A is an exploded perspective view of the solar panel.
Figure 2B:
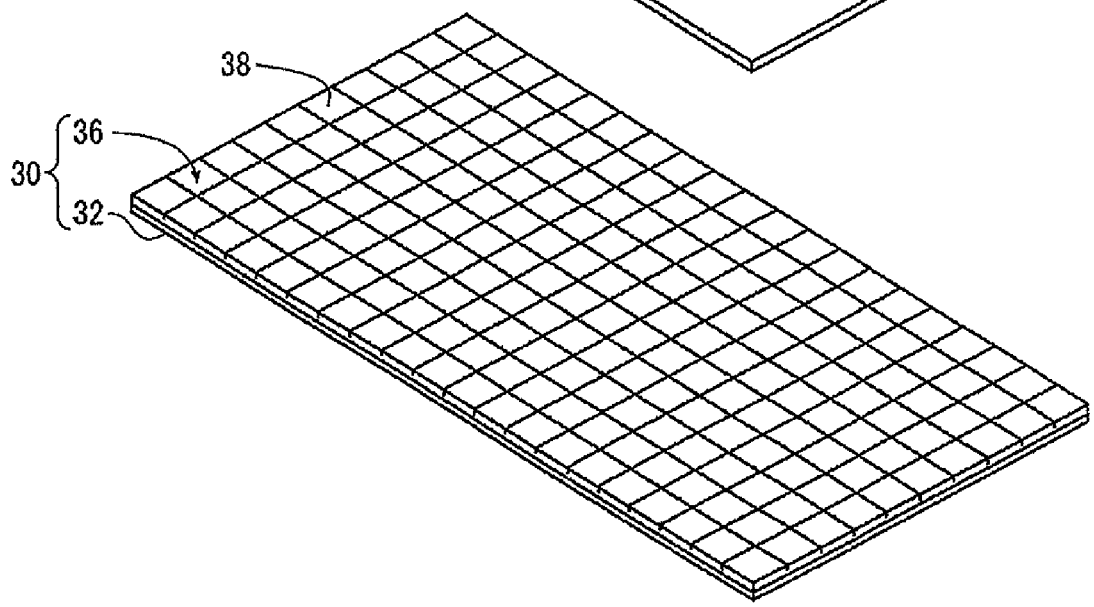
FIG. 2B is a perspective view of the solar panel.

A solar panel 30 illustrated in FIG. 2A and FIG. 2B includes a rectangular panel 32, a plurality of ultrasonic vibrators 34 in a circular shape arranged on an upper surface of the panel 32 at intervals, and a solar cell 36 attached on the upper surface of the panel 32 on which the plurality of ultrasonic vibrators 34 are arranged. The ultrasonic vibrators 34 generating ultrasonic vibration to a light receiving surface 38 of the solar panel 30 may be formed of piezoelectric ceramics or the like. Control means (not illustrated) controlling operation of the ultrasonic vibrators 34 and a power supply (not illustrated) supplying electric power to the ultrasonic vibrators 34 and the control means are connected to each of the ultrasonic vibrators 34.

When the solar panel 30 is installed, it is preferable to install the solar panel 30 such that the light receiving surface 38 of the solar panel 30 is inclined with respect to the horizontal direction and faces the sun. Then, ultrasonic vibration is periodically or arbitrarily generated to the light receiving surface 38 of the solar panel 30 by the ultrasonic vibrators 34. For example, a control program for periodically operating the ultrasonic vibrators 34 is stored in the control means in advance, and ultrasonic vibration can be periodically generated to the light receiving surface 38. Alternatively, by operating the ultrasonic vibrators 34 upon inputting a command for operating the ultrasonic vibrators 34 to the control means, ultrasonic vibration may be arbitrarily generated to the light receiving surface 38. Thus, generation of ultrasonic vibration to the light receiving surface 38 enables easy removal of snow or dust deposited on the light receiving surface 38 without involving some danger, and accordingly, an amount of receiving light onto the solar panel 30 can be maintained. When the solar panel 30 is installed such that the light receiving surface 38 is inclined with respect to the horizontal direction, it is possible to efficiently flow snow deposited on the light receiving surface 38 down by generating ultrasonic vibration to the light receiving surface 38. In addition, even when dust is attached to the light receiving surface 38, ultrasonic vibration is generated to the light receiving surface 38 by inputting the command for operating the ultrasonic vibrators 34 to the control means when it rains, so that it is possible to remove the dust from the light receiving surface 38 by the ultrasonic vibration and rain water.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An installation method of a solar panel, comprising:
   an installation step of installing the solar panel such that a light receiving surface of the solar panel is inclined with respect to the horizontal direction and faces the sun; and
   an ultrasonic vibrator arrangement step of arranging at least one of a plurality of ultrasonic vibrators generating ultrasonic vibration to the light receiving surface of the solar panel,
   whereby the installation step is performed using an installation frame comprising a rectangular installation plate having a side wall and a plurality of rectangular shaped openings extending in a lateral direction of the installation plate, and whereby the installation plate additionally includes a through-hole for each ultrasonic vibrator,
   whereby the ultrasonic vibrator arrangement step is performed subsequent to the installation step, and the plurality of ultrasonic vibrators are arranged at intervals on the installation plate by inserting each of the ultrasonic vibrators into one of said through-holes,
   wherein snow or dust deposited on the light receiving surface of the solar panel is removed by the ultrasonic vibration.

2. The installation method of a solar panel according to claim 1, wherein the installation step further comprises:
   adjusting a direction of the installation frame such that an upper surface of the installation plate faces the sun;

fixing the installation frame to an installation surface by a plurality of anchor bolts;

fixing the solar panel to the upper surface of the installation plate such that a plurality of solar cells located at an upper surface of the solar panel face the sun.

3. The installation method of a solar panel according to claim 1, wherein the installation frame further comprises:
a plurality of substrates disposed at predetermined intervals;
a plurality of bolt holes through each of which an anchor bolt fixing each of the plurality of substrates to an installation surface are formed;
and a plurality of support columns extending upward from an upper surface of each of the plurality of substrates;
wherein the installation plate is fixed to an upper end portion of each of the plurality of support columns,
wherein the installation step further comprises attaching the solar panel to the installation plate.

4. The installation method of a solar panel according to claim 1, wherein the installation frame further comprises:
a plurality of substrates disposed at predetermined intervals;
a plurality of bolt holes through each of which an anchor bolt fixing each of the plurality of substrates to an installation surface are formed;
and a plurality of support columns extending upward from an upper surface of each of the plurality of substrates;
wherein the installation plate is fixed to an upper end portion of each of the plurality of support columns,
wherein the installation step further comprises:
adjusting a direction of the installation frame such that an upper surface of the installation frame faces the sun;
fixing the installation frame to the installation surface by the plurality of anchor bolts;
fixing the solar panel to the installation plate such that a plurality of solar cells located at an upper surface of the solar panel face the sun.

5. The installation method of a solar panel according to claim 3, wherein the plurality of support columns comprise a plurality of differing upward heights, such that the installation plate is inclined with respect to the installation surface during the installation step.

6. The installation method of a solar panel according to claim 4, wherein the plurality of support columns comprise a plurality of differing upward heights, such that the installation plate is inclined with respect to the installation surface during the installation step.

7. An installation method of a solar panel, comprising:
an installation step of installing the solar panel such that a light receiving surface of the solar panel is inclined with respect to the horizontal direction and faces the sun; and
an ultrasonic vibrator arrangement step of arranging at least one of a plurality of ultrasonic vibrators generating ultrasonic vibration to the light receiving surface of the solar panel,
whereby the ultrasonic vibrator arrangement step is performed subsequent to the installation step, and the plurality of ultrasonic vibrators are arranged at intervals on an installation plate of an installation frame, wherein the installation plate includes a plurality of rectangular-shaped openings and a plurality of through-holes,
wherein the installation step further comprises:
inserting each of said ultrasonic vibrators into an associated one of said through-holes;
adjusting a direction of the installation frame such that the upper surface of the installation frame faces the sun;
fixing the installation frame to an installation surface by a plurality of anchor bolts;
fixing the solar panel to the upper surface of the installation frame such that a plurality of solar cells located at an upper surface of the solar panel face the sun;
wherein snow or dust deposited on the light receiving surface of the solar panel is removed by the ultrasonic vibration.

* * * * *